(12) United States Patent
Diaz

(10) Patent No.: US 10,781,624 B2
(45) Date of Patent: Sep. 22, 2020

(54) SYSTEM AND METHOD FOR SELECTIVELY CONTROLLING A WINDOW OF A POWER WINDOW SYSTEM OF A VEHICLE

(71) Applicant: Felix Diaz, Algonquin, IL (US)

(72) Inventor: Felix Diaz, Algonquin, IL (US)

( * ) Notice: Subject to any disclaimer, the term of this patent is extended or adjusted under 35 U.S.C. 154(b) by 139 days.

(21) Appl. No.: 15/612,248

(22) Filed: Jun. 2, 2017

(65) Prior Publication Data

US 2017/0350183 A1 Dec. 7, 2017

Related U.S. Application Data

(60) Provisional application No. 62/344,462, filed on Jun. 2, 2016.

(51) Int. Cl.
*B60H 1/00* (2006.01)
*E05F 15/77* (2015.01)

(52) U.S. Cl.
CPC ......... *E05F 15/77* (2015.01); *B60H 1/00657* (2013.01); *E05Y 2400/30* (2013.01); *E05Y 2400/85* (2013.01); *E05Y 2900/55* (2013.01)

(58) Field of Classification Search
CPC .. E05F 15/77; E05Y 2900/55; E05Y 2400/85; E05Y 2400/30; B60H 1/00657
See application file for complete search history.

(56) References Cited

U.S. PATENT DOCUMENTS

| | | | |
|---|---|---|---|
| 5,420,568 A | 5/1995 | Iida et al. | |
| 5,698,907 A | 12/1997 | Weber | |
| 6,944,528 B2 | 9/2005 | Nagano | |
| 7,046,126 B2 | 5/2006 | Flick | |
| 8,433,456 B2 | 4/2013 | Peterson et al. | |
| 2003/0231131 A1* | 12/2003 | Dimig | B60R 25/209 341/176 |
| 2011/0190962 A1* | 8/2011 | Peterson | G06F 7/00 701/2 |
| 2012/0188627 A1 | 7/2012 | Chen et al. | |
| 2012/0313768 A1* | 12/2012 | Campbell | B60R 25/2009 340/438 |

* cited by examiner

*Primary Examiner* — Genna M Mott
(74) *Attorney, Agent, or Firm* — Boudwin Intellectual Property; Daniel Boudwin

(57) ABSTRACT

A system and method for selectively controlling a specific window of a power window system of a vehicle. The system includes a portable remote control including activation switches, each corresponding to a specific power window of a vehicle, a first wireless transceiver mounted onto the vehicle, and a second wireless transceiver disposed in the portable remote control. Actuation of an activation switch causes the second wireless transceiver to communicate a demand signal to the first wireless transceiver that identifies the specific power window of the vehicle corresponding to the actuated activation switch. The first wireless transceiver receives the demand signal and communicates instruction to an electronic control unit of the vehicle to actuate the specific window identified by the demand signal. The electronic control unit then actuates the specific power window of the vehicle that corresponds to the activation switch initially actuated.

13 Claims, 5 Drawing Sheets

SYSTEM AND METHOD FOR SELECTIVELY CONTROLLING A WINDOW OF A POWER WINDOW SYSTEM OF A VEHICLE

CROSS REFERENCE TO RELATED APPLICATIONS

This application claims the benefit of U.S. Provisional Application No. 62/344,462 filed on Jun. 2, 2016. The above identified patent application is herein incorporated by reference in its entirety to provide continuity of disclosure.

BACKGROUND OF THE INVENTION

The present invention relates to a system for controlling a vehicle. More specifically, the present invention relates to a system for selectively controlling a window of the power window system of a vehicle.

Many vehicles come equipped with systems that enable remote actuation of various vehicle functions through a portable remote control, i.e., a key fob. Vehicle functions commonly included in such remote actuation systems include locking/unlocking of passenger cabin entry doors, unlatching/latching of trunks and tailgates, and powered opening/closing of various closures, such as tailgates, sliding doors, etc. Some of these systems also include a power window control function that allows windows of the vehicle to be opened or closed remotely using the portable remote control. This sometimes includes powered opening or closing of a sunroof on sunroof equipped vehicles.

One longstanding problem for vehicle owners having such power window control systems, however, is that these systems lack the ability to control each window independently via a portable remote control. Currently, remote control power window systems include a function that sends just one signal to the electronic control unit or the door control unit of a vehicle that then causes the power window system to actuate all power windows of a vehicle at once, rather than independently. Occasionally, individuals wish to control, i.e., open or close, a specific window of a vehicle for a specific reason, whether it be to open a moonroof and a rear passenger window independently of the other windows in order to provide fresh air to the vehicle, or close a rear passenger window only, after the rear passenger window and front passenger window were inadvertently left open.

SUMMARY OF THE INVENTION

In view of the foregoing disadvantages inherent in the known types of systems for selectively controlling power windows now present in the prior art, the present invention provides a system and method for selectively controlling a specific window of the power window system of a vehicle wherein the same can be utilized for providing convenience for the user when selectively controlling the windows of a power window system of a vehicle from a remote location.

In one embodiment of the present invention, the system for selectively controlling a specific window of the power window system of a vehicle includes a portable remote control including a first plurality of activation switches, a first wireless transceiver mounted onto the vehicle, and a second wireless transceiver disposed in the portable remote control. Each of the plurality of activation switches correspond to a specific power window of a vehicle. The first wireless transceiver in communication with an electronic control unit of the vehicle. The second wireless transceiver is in communication with the first wireless transceiver. Actuation of one of the first plurality of activation switches generates a demand signal identifying the specific window to which the actuated activation switch corresponds. The second wireless transceiver is configured to communicate the demand signal of the actuated activation switch to the first wireless transceiver. The first wireless transceiver is configured to receive the demand signal from the second wireless transceiver. The first wireless transceiver transmits an actuation signal to the electronic control unit of the vehicle upon reception of the demand signal. The actuation signal includes an instruction to the electronic control unit to actuate the specific window that the demand signal identifies.

In another embodiment of the present invention, the method for selectively controlling a specific window of the power window system of a vehicle includes actuating an activation switch on a portable remote control that corresponds to a target window of a power window system of a vehicle, generating a unique demand signal identifying the target window corresponding to the actuated activation switch, transmitting the unique demand signal wirelessly via a wireless transceiver disposed in the portable remote control, receiving the unique demand signal wirelessly via a wireless transceiver mounted onto the vehicle, generating an actuation signal including instruction to actuate the target window corresponding to the unique demand signal received by the wireless transceiver of the vehicle, transmitting the actuation signal to an electronic control board controlling the power window system of the vehicle, and actuating the target window of the power window system of the vehicle.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
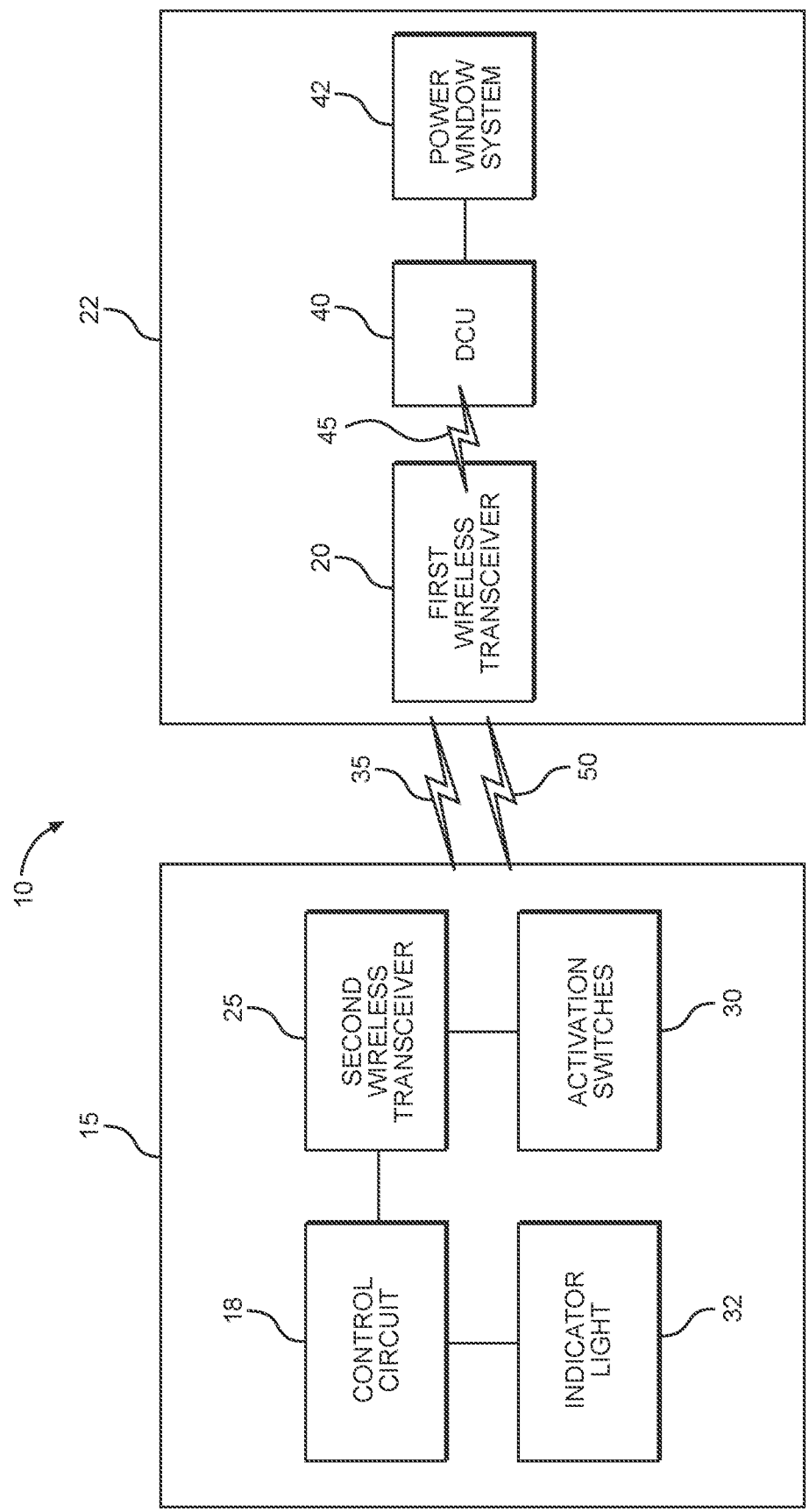
FIG. 1 shows a schematic diagram of the system for selectively controlling a specific window of the power window system of a vehicle.

Reference is made herein to the attached drawings. Like reference numerals are used throughout the drawings to depict like or similar elements of the system and method for selectively controlling a window of a power window system of a vehicle. The figures are intended for representative purposes only and should not be considered to be limiting in any respect. The term "signal" as used herein should be construed as an electrical impulse or radio wave transmitted or received.

Referring to FIG. 1, there is shown a schematic diagram of a system for selectively controlling a window of the power window system of a vehicle. The system 10 comprises a portable remote control 15 in wireless communication with a first wireless transceiver 20 mounted onto a vehicle 22. The portable remote control 15 includes a control circuit 18, a second wireless transceiver 25, a plurality of actuable activation switches 30, and an indicator light 32. The first wireless transceiver 20 is in communication with the electronic control unit (ECU), e.g., the door control unit (DCU) 40, of the vehicle, which in turn is coupled to the power window system 42 of the vehicle 22. It is well known in the art that a DCU is responsible for controlling and monitoring various electronic accessories in a vehicle's door, such as the power window system of a vehicle, which includes, but is not limited to, a front driver side window, a front passenger side window, a rear driver side window, a rear passenger side window, a sunroof/moonroof, and all associated actuators for operating these windows.

The control circuit 18 is in communication with the second wireless transceiver 25 and the indicator light 32, while the second wireless transceiver 25 is in communication with the plurality of activation switches 30. The plurality of activation switches 30 correspond to a specific power window of the vehicle 22, e.g., the front driver side window, the front passenger side window, the rear driver side window, the rear passenger side window, and the sunroof/moonroof, such that when actuated, the plurality of activation switches 30 cause the second wireless transceiver 25 to generate a demand signal 35 configured to control that specific power window of the vehicle 22, i.e., the window with which the activation switch 30 generating that demand signal 35 corresponds to.

For example, in one embodiment of the present invention, the plurality of activations switches 30 includes a first, second, third, fourth, and fifth activation switch corresponding to the front driver side window, the front passenger side window, the rear driver side window, the rear passenger side window, and the sunroof/moonroof, respectively. Therefore, when actuated, the first activation switch generates a first demand signal corresponding to the front driver side window of the vehicle, the second activation switch generates a second demand signal corresponding to the front passenger side window of the vehicle, the third activation switch generates a third demand signal corresponding to the rear driver side window of the vehicle, the fourth activation switch generates a fourth demand signal corresponding to the rear passenger side window of the vehicle, and the fifth activation switch generates a fifth demand signal corresponding to the sunroof/moonroof of the vehicle.

After the demand signal 35 is generated it is transmitted wirelessly to the first wireless transceiver 20 via the second wireless transceiver 25. In the illustrated embodiment, each demand signal 35 includes an open window demand signal and a close window demand signal for the specific window of the vehicle 22 that it corresponds to. For example, in one embodiment of the present invention, actuating an activation switch once and holding the switch down initiates an open window demand signal and actuating an activation switch twice and then holding the switch down initiates a close window demand signal.

The first wireless transceiver 20 is configured to receive the demand signals 35 transmitted from the second wireless transceiver 25 of the portable remote control 15. Once a demand signal 35 is received by the first wireless transceiver 20, the first wireless transceiver 20 transmits an actuation signal 45 to the DCU 40. The actuation signal 45 includes specific instructions to actuate the window corresponding to the actuated activation switch 30 that generated the demand signal 35. Once the DCU 40 receives the actuation signal 45, the DCU 40 performs the specific instructions accompanying the actuation signal 45, thereby actuating the specific actuator configured to drive the window of the vehicle 22 with which the received demand signal 35 corresponds to.

For example, in one operation of the present invention, if an activation switch 30 corresponding to a front driver side window is actuated, a demand signal 35 corresponding solely to the front driver side window will be transmitted from the portable remote control 15 to the first wireless transceiver 20. Upon reception of this demand signal 35, the first wireless transceiver 20 will in turn transmit an actuation signal 45 to the DCU 40 that includes specific instructions to actuate only the front driver side window of the vehicle. And depending on whether the demand signal 35 is an open window or close window demand signal, the front driver side window will either close or open as desired by a user. In this way, a user may selectively control a window of the power window system of a vehicle from a remote location. In one embodiment, the first wireless transceiver 20 is configured to receive the demand signal 35 within a one mile radius. In this way, a user may control the power windows of his or her vehicle from a remote distant location upon realization of a vehicle window being left open inadvertently.

When the first wireless transceiver 20 has successfully transmitted a demand signal 35 to the DCU 40, the first wireless transceiver 20 sends a confirmation signal 50 to the portable remote control 15. The second wireless transceiver 25 is configured to receive the confirmation signal 50 generated by the first wireless transceiver 20. Once the confirmation signal 50 is received by the second wireless transceiver 25, the control circuit 18 activates the indicator light 32 disposed on the portable remote control 15 to alert a user that the window corresponding to the actuated activation switch has been either closed or opened.

In another embodiment, when the first wireless transceiver 20 has unsuccessfully communicated a demand signal 35 to the DCU 40, the first wireless transceiver 20 sends a refusal signal to the portable remote control 15. The second wireless transceiver 25 is configured to receive the refusal signal generated by the first wireless transceiver 20. Once the refusal signal 50 is received by the second wireless transceiver 25, the control circuit 18 activates the indicator light 32 disposed on the portable remote control 15 to alert a user that no window has been either closed or opened.

Figure 2:
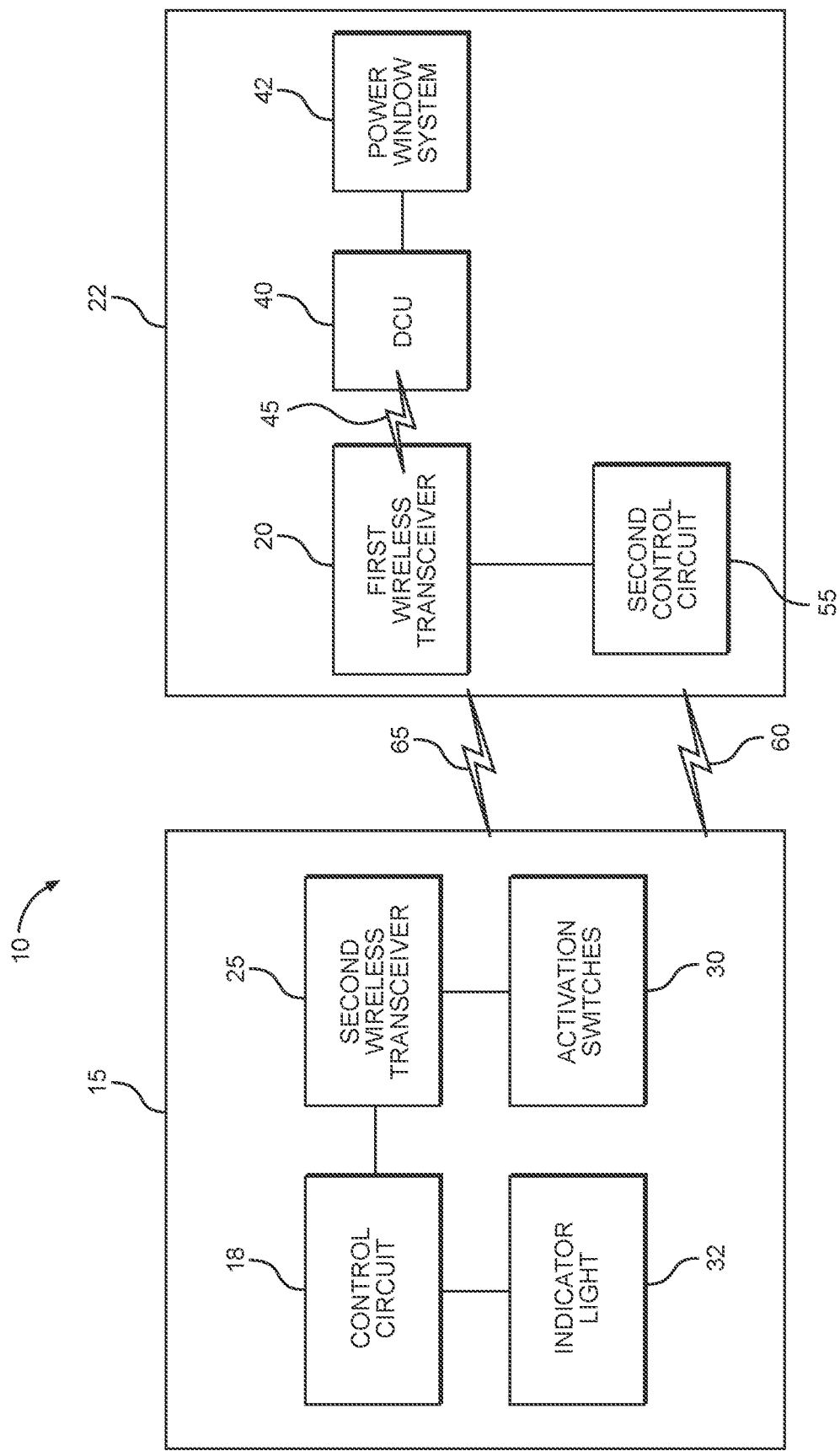
FIG. 2 shows a schematic diagram of the system for selectively controlling a specific window of the power window system of a vehicle according to an alternative embodiment of the present invention.

Referring now to FIG. 2, there is shown a schematic diagram of the system for selectively controlling a window of the power window system of a vehicle according to an alternative embodiment of the present invention. In one embodiment of the present invention, the system 10 further includes a second control circuit 55 mounted on the vehicle 22 that is in communication with the first wireless transceiver 20. Upon the first wireless transceiver 20 receiving a demand signal 35, the second control circuit 55 initiates a proximity verification step, in which the second control circuit 55 pauses the transmission of the actuation signal 45 to the DCU 40, and transmits a proximity verification signal 60 to the portable remote control 15 via the first wireless transceiver 20 in order to confirm the portable remote control 15 is within a predetermined range of the control circuit 55. If the portable remote control 15 is within the predetermined range, the second wireless transceiver 25 is configured to receive the proximity verification signal 60 and transmit a proximity confirmation signal 65 to the first wireless transceiver 20. The first wireless transceiver 20 is configured to receive the proximity confirmation signal 65 and when received, the control circuit 55 will enable the first wireless transceiver 20 to transmit the actuation signal 45 to the DCU 40 in order to actuate a window of the power window system 42 of the vehicle 22. In one embodiment, the second wireless transceiver 25 receives the proximity verification signal 60 and transmits the proximity confirmation signal 65 only if the control circuit 55 is within a mile away from the portable remote control 15.

Figure 3:
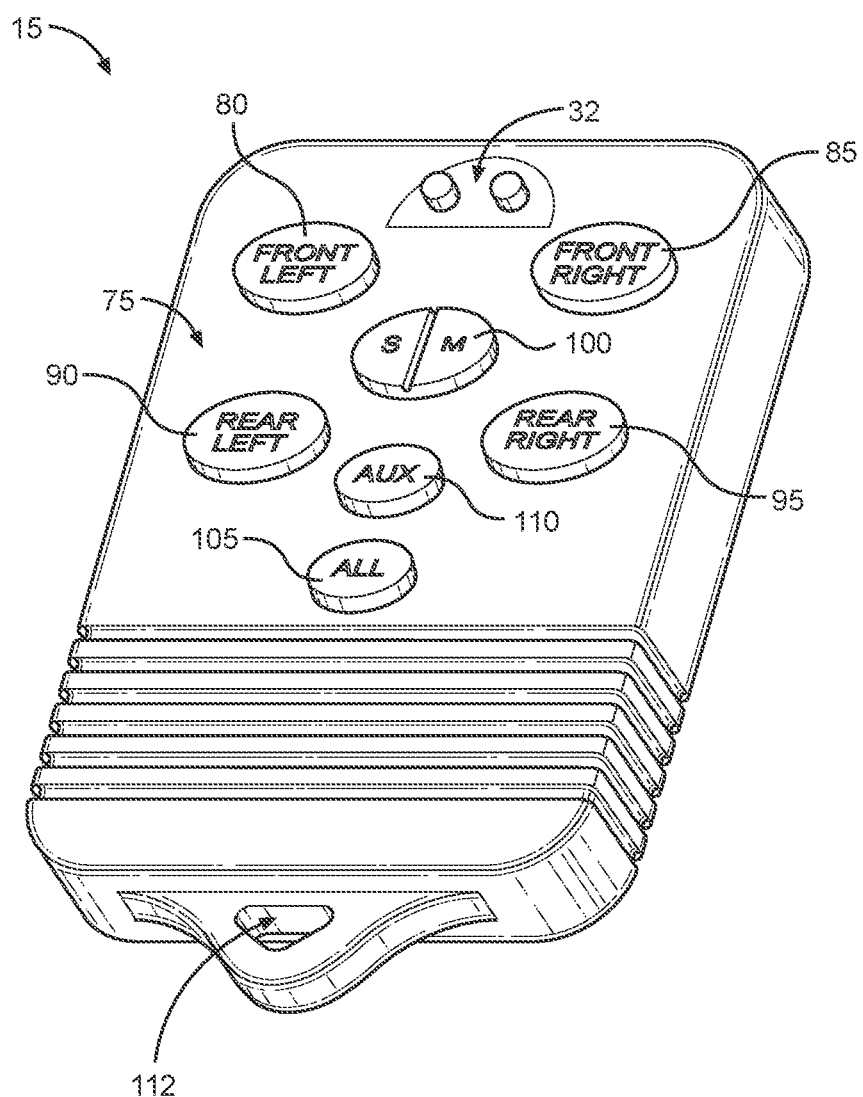
FIG. 3 shows a perspective view of the first side of the portable remote control of the system for selectively controlling a specific window of the power window system of a vehicle.

Referring now to FIG. 3, there is shown a perspective view of the first side of the portable remote control of the system for selectively controlling a specific window of the power window system of a vehicle. The portable remote control 15 includes a housing 70 having a first side 75 including the plurality of activation switches, the second wireless transceiver disposed within the housing 70, and the indicator light 32. In the depicted embodiment, the plurality of activation switches include a first button 80 corresponding to the front driver side window a vehicle, i.e., the front left window, a second button 85 corresponding to the front passenger side window the vehicle, i.e., the front right window, a third button 90 corresponding to the rear driver side window of the vehicle, i.e., the rear left window, a fourth button 95 corresponding to the rear passenger side window of the vehicle, i.e., the rear right window, and a fifth button 100 corresponding to the sunroof/moonroof of the vehicle. In the depicted embodiment, the indicator light 32 includes a pair of lights including a red and green light, in which the green light is configured to light up, i.e., blink, or flash, when a confirmation signal has been received by the portable remote control 15 and the red light is configured to light up, i.e., blink, or flash, when a refusal signal has been received by the portable remote control 15.

In the depicted embodiment, the portable remote control 15 further comprises a second plurality of activation switches including an all-window control button 105, which is configured to generate a demand signal that causes the DCU to actuate all windows of the power window system of the vehicle at the same time, and an auxiliary control button 110 which is configured to generate a demand signal that causes the DCU to actuate the side view mirrors and/or the rear window of the power window system of a vehicle, and a key hole 112. The all-window control button 105 and the auxiliary control button would operate according to the system illustrated in FIG. 1

Figure 4:
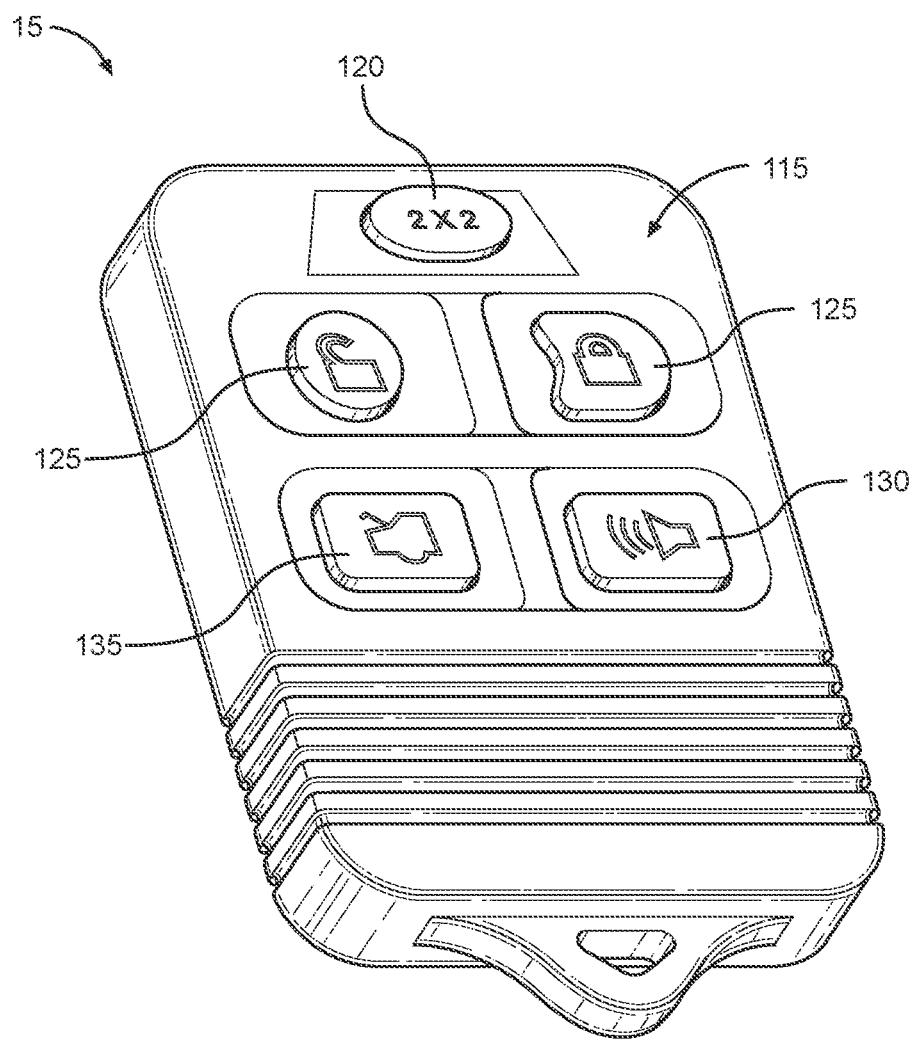
FIG. 4 shows a perspective view of the second side of the portable remote control of the system for selectively controlling a specific window of the power window system of a vehicle.

Referring now to FIG. 4, there is shown a perspective view of the second side of the portable remote control of the system for selectively controlling a specific window of the power window system of a vehicle. In one embodiment, the portable remote control 15 further includes a second side 115 including a third plurality of activation switches for controlling other particular functions of a vehicle. For instance, in the depicted embodiment, the third plurality of activation switches include a remote start button 120 for starting the car from a remote location, unlock/lock buttons 125, a panic button 130, and an open trunk button 135. The remote start button 120, the unlock/lock buttons 125, the panic button 130, and the open trunk button 135 would operate as they would in conventional usage, which operation is well known in the art.

Figure 5:
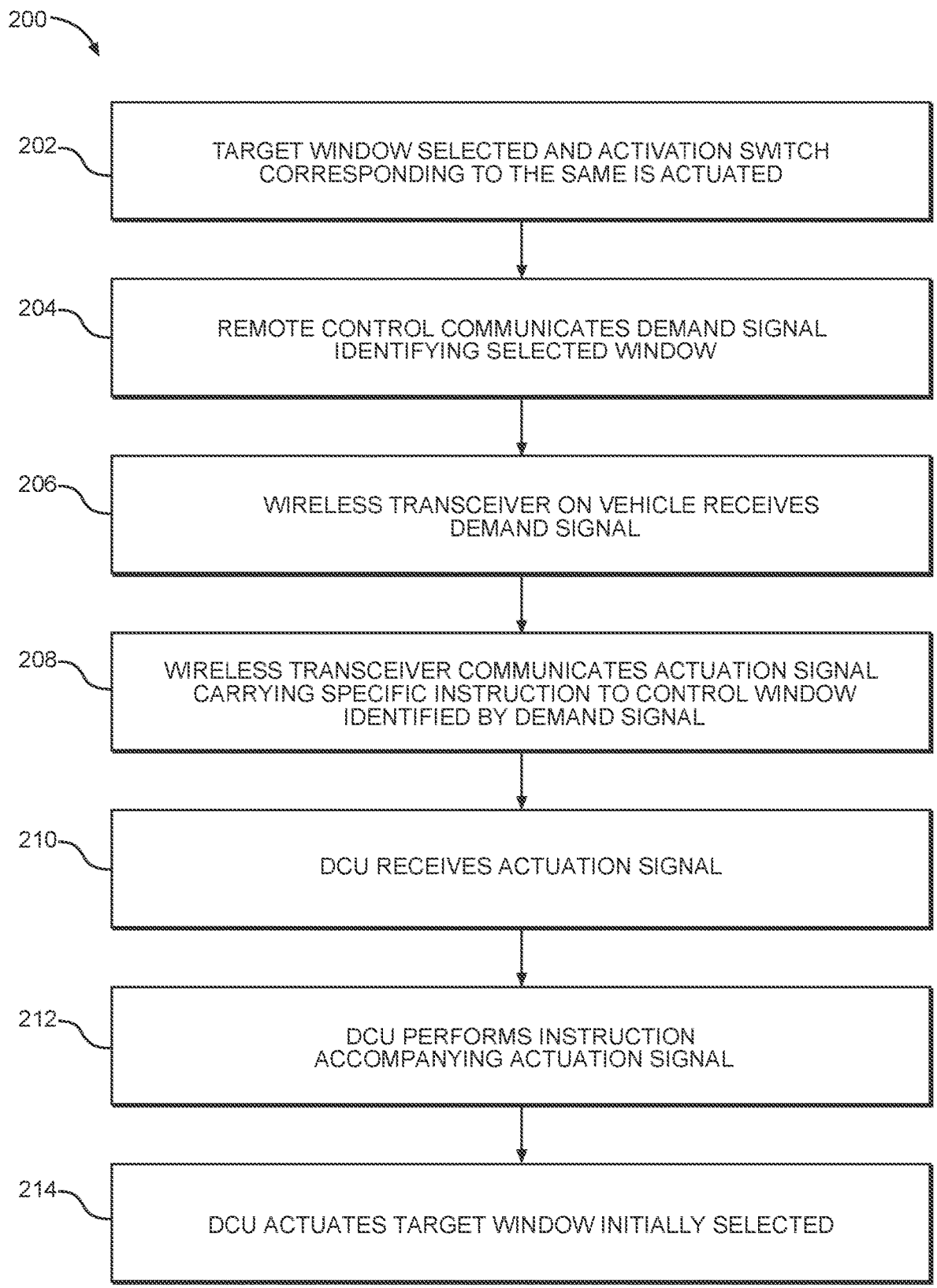
FIG. 5 shows a flow chart of the method for selectively controlling a specific window of the power window system of a vehicle.

Referring now to FIG. 5, there is shown a flowchart for a method of selectively controlling a window of the power window system of a vehicle. In one example, the method 200 for selectively controlling a window of the power window system of a vehicle is employed with the system shown in FIG. 1 and will be described with particular reference thereto. In order to selectively control a window, a user first selects a target window in which he or she wishes to control and actuates the activation switch 30 on the portable remote control 15, which corresponds to the same, as illustrated by step 202. Next, the portable remote control 15 communicates a demand signal 35 to the first wireless transceiver 20 via the second wireless transceiver 25 that identifies the window in which a user wishes to control, as illustrated by step 204. Next, the first wireless transceiver 20 receives the demand signal 35 and communicates an actuation signal 45 to the DCU 40 that includes instructions to control the window in which the demand signal 25 has identified, as illustrated by steps 206 and 208. Next, the DCU receives and performs the instructions accompanying the actuation signal 45, thereby actuating the target window originally selected by the user on the portable remote control 15, as illustrated by steps 210-214.

It is therefore submitted that the instant invention has been shown and described in various embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A system for selectively controlling the opening and closing of a window of a power window system of a vehicle, comprising:
   a portable remote control including a first plurality of activation switches, each of the first plurality of activation switches corresponding to a specific power window of a vehicle;
   wherein the portable remote control comprises a housing having a first side opposite a second side, wherein the first plurality of activation switches are disposed on the first side, and a second plurality of activation switches are disposed on the second side;
   wherein the second plurality of activation switches comprise a remote start button, unlock/lock buttons, a panic button, and an open trunk button;
   a first wireless transceiver mounted onto the vehicle, the first wireless transceiver in communication with an electronic control unit of the vehicle;
   a second wireless transceiver disposed in the portable remote control, the second wireless transceiver in communication with the first wireless transceiver;
   wherein actuation of one of the first plurality of activation switches generates a demand signal identifying the specific window to which the actuated activation switch corresponds;

wherein the demand signal corresponds to lowering the specific window when the activation switch is actuated once and held, and wherein the demand signal corresponds to raising the specific window when the activation switch is actuated twice and held;

wherein the second wireless transceiver is configured to communicate the demand signal of the actuated activation switch to the first wireless transceiver only while the activation switch is actuated, such that when the activation switch is released, the demand signal is no longer generated;

wherein the first wireless transceiver is configured to receive the demand signal from the second wireless transceiver;

wherein the first wireless transceiver transmits an actuation signal to the electronic control unit of the vehicle upon reception of the demand signal;

wherein the actuation signal includes an instruction to the electronic control unit to actuate the specific window that the demand signal identifies.

2. The system of claim 1, wherein the portable remote control further comprises a control circuit and an indicator light including a green light and a red light.

3. The system of claim 2, wherein the first wireless transceiver is configured to communicate a confirmation signal upon successful transmission of the demand signal to the electronic control unit;

wherein the second wireless transceiver is configured to receive the confirmation signal;

wherein the control circuit activates the green light of the indicator light upon the second wireless transceiver receiving the confirmation signal.

4. The system of claim 3, wherein the first wireless transceiver is configured to communicate a refusal signal upon unsuccessful transmission of the demand signal to the electronic control unit;

wherein the second wireless transceiver is configured to receive the refusal signal;

wherein the control circuit activates the red light of the indicator light upon the second wireless transceiver receiving the refusal signal.

5. The system of claim 1, further comprising a second control circuit mounted onto the vehicle, the second control circuit configured to pause communication of the demand signal to the electronic control unit and communicate a proximity verification signal to the portable remote control via the first wireless transceiver in order to confirm the portable remote control is within a predetermined range.

6. The system of claim 5, wherein the second wireless transceiver is configured to receive the proximity verification signal if the portable remote control is within the predetermined range and communicate a proximity confirmation signal to the first wireless transceiver upon reception of the proximity verification signal.

7. The system of claim 6, wherein the first wireless transceiver is configured to receive the proximity confirmation signal and the second control circuit is configured to resume communication of the demand signal to the electronic control unit upon reception of the proximity confirmation signal by the first wireless transceiver.

8. The system of claim 1, wherein the first plurality of activation switches include at least a first activation switch corresponding to a front driver side window of the vehicle and a second activation switch corresponding to a front passenger side window of the vehicle;

wherein actuation of the first activation switch generates a first demand signal and actuation of the second activation switch generates a second demand signal.

9. The system of claim 8, wherein the first plurality of activation switches further include a third activation switch corresponding to a rear driver side window of the vehicle and a fourth activation switch corresponding to a rear passenger side window of the vehicle;

wherein actuation of the third activation switch generates a third demand signal and actuation of the fourth activation switch generates a fourth demand signal.

10. The system of claim 9, wherein the first plurality of activation switches further include a fifth activation switch corresponding to a sunroof/moonroof of the vehicle;

wherein actuation of the fifth activation switch generates a fifth demand signal.

11. The system of claim 10, wherein the portable remote control further includes a third plurality of activation switches including an all-window control button corresponding to all windows of the vehicle and an auxiliary control button corresponding the side view mirrors and rear windows of the vehicle;

wherein actuation of the all-window control button generates a sixth demand signal and actuation of the auxiliary control button generates a seventh demand signal.

12. The system of claim 11, wherein the third plurality of activation switches are disposed on the first side of the housing.

13. A method for selectively controlling the opening and closing of a window of a power window system of a vehicle, comprising the steps of:

actuating an activation switch of a first plurality of activation switches on a portable remote control that corresponds to a target window of a power window system of a vehicle;

wherein actuating the activation switch once and holding the activation switch in an actuated state corresponds to lowering the target window, and actuating the activation switch twice and holding the activation switch in an actuated state corresponds to raising the target window;

wherein the portable remote control comprises a housing having a first side opposite a second side, wherein the first plurality of activation switches are disposed on the first side, and a second plurality of activation switches are disposed on the second side;

wherein the second plurality of activation switches comprise a remote start button, unlock/lock buttons, a panic button, and an open trunk button;

generating a unique demand signal identifying the target window corresponding to the actuated activation switch;

transmitting the unique demand signal wirelessly via a wireless transceiver disposed in the portable remote control only while the activation switch is actuated, such that when the activation switch is released, the demand signal is no longer generated;

wherein the unique demand signal corresponds to the direction of actuation of the activation switch;

receiving the unique demand signal wirelessly via a wireless transceiver mounted onto the vehicle;

generating an actuation signal including instruction to actuate the target window corresponding to the unique demand signal received by the wireless transceiver of the vehicle;

transmitting the actuation signal to an electronic control board controlling the power window system of the vehicle;

actuating the target window of the power window system of the vehicle.

\* \* \* \* \*